(12) United States Patent
Lundy et al.

(10) Patent No.: US 7,031,449 B1
(45) Date of Patent: Apr. 18, 2006

(54) METHOD FOR PROVIDING A CALL LOG ENTRY FOR A TRANSFERRED CALL

(75) Inventors: Michael T. Lundy, Olathe, KS (US);
Benjamin Blinn, Westwood, KS (US);
Steve Thoeni, San Diego, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 42 days.

(21) Appl. No.: 10/826,177

(22) Filed: Apr. 16, 2004

(51) Int. Cl.
*H04M 3/42* (2006.01)

(52) U.S. Cl. .......................... 379/212.01; 379/211.01; 455/466

(58) Field of Classification Search ............ 379/88.11, 379/88.16, 211.01, 211.02, 212.01, 213.01, 379/218.01; 455/466
See application file for complete search history.

(56) References Cited

U.S. PATENT DOCUMENTS

| | | | |
|---|---|---|---|
| 4,677,609 A | 6/1987 | Piereth et al. ................. | 370/60 |
| 5,689,547 A | 11/1997 | Mölne .......................... | 379/58 |
| 6,011,976 A | 1/2000 | Michaels et al. ............ | 455/466 |
| 6,021,190 A * | 2/2000 | Fuller et al. ........... | 379/212.01 |
| 6,381,325 B1 | 4/2002 | Hanson ................... | 379/218.01 |
| 6,442,259 B1 * | 8/2002 | Culli et al. ............. | 379/114.05 |
| 6,628,772 B1 | 9/2003 | Cox et al. .............. | 379/218.01 |
| 6,795,542 B1 * | 9/2004 | St. Jean .................. | 379/212.01 |
| 6,904,137 B1 * | 6/2005 | Brandt et al. ................ | 379/126 |

FOREIGN PATENT DOCUMENTS

WO    WO 94/30023    12/1994

OTHER PUBLICATIONS

*Webhelp Announces Release of Enhanced 411 Directory Assistance Service*, http://www.webhelp.com/webhelp/newsroom/pr010906.jsp, Sep. 6, 2001, pp. 1-2.
*Wireless Users Can Now Get Telephone Listings Without Going Through an Operator*, http://www.Issi.net/Downloads/LSSiPR_Jolt%2004-08-2002.pdf, Apr. 8, 2002, pp. 1-3, printed from the World Wide Web on Nov. 6, 2003.
Pierz, Kathleen, *AT&T Wireless Announces Directory Assistance/Enquiry via Text Messaging*, ZelosGroup, May 13, 2003, pp. 1-5, printed from the World Wide Web on Nov. 6, 2003.
AT&T Text Directory, May 8, 2003, http://www.shhh.org/html/press_release_tx411_final_5-0.htm, pp. 1-4.
*Mforma Powers TXT-411 Service of AT&T Wireless*, http://www.mforma.com/releases/070803.shtml, Jul. 8, 2003, pp. 1-2.

* cited by examiner

*Primary Examiner*—Bing Q. Bui

(57) ABSTRACT

A method for providing a call log entry for a transferred call is described. A subscriber using a subscriber terminal calls a first telephone number associated with a first party. The first party transfers the subscriber to a second party associated with a second telephone number. The first party sends the subscriber terminal a data message indicating that a call was transferred to the second telephone number. The data message contains the second telephone number and a time stamp indicating a time that the call was connected. As a result, the call log contains a call log entry for the call connected between the subscriber and the second party.

23 Claims, 4 Drawing Sheets

METHOD FOR PROVIDING A CALL LOG ENTRY FOR A TRANSFERRED CALL

FIELD OF THE INVENTION

The present invention relates to communication systems and, more particularly, to a method for providing a call log entry for a transferred call.

BACKGROUND

A call log is a feature found on many telephones. The call log may list the calls connected to the telephone, which typically includes incoming, outgoing, and missed calls. Details in the call log may include the telephone number of the other party connected to the call and the time of connection, otherwise referred to as a time stamp. More detailed call logs may also include the name of the party, the date of the call, the length of the call, and other details regarding the call.

The call log may be useful to a subscriber who wants a record of a call. The subscriber may use the call log to locate a telephone number from a previous call. By having the telephone number from a previous call, the subscriber may be able to regenerate the call at a later time. Additionally, the call log may be used to remember when a call was connected, which may be used to calculate elapsed time since the call was connected. For example, a subscriber may call a help desk and ask a question. The person at the help desk may tell the subscriber that they will call the subscriber within 48 hours with the answer to the question. The subscriber may then use the call log to determine if the person at the help desk returned the call within the promised time.

In some cases, an initial call will be transferred to a second party. Continuing with the example above, the person at the help desk may not have the ability to answer the subscriber's question and transfer the call to a telephone number of a second person who may be able to answer the question. In this scenario, the initial call to the help desk would appear in the subscriber's call log, but the transferred call may not. If the transferred call is not recorded in the call log, the subscriber may not have the telephone number of the second person or have a record of when the call was transferred to the second person.

Another example of a transferred call is a call transferred by telephone directory assistance. Telephone directory assistance is a service in which a person can obtain a telephone number for a specified party. The person may supply a name and a city location of the party to a directory assistance operator. With this information, the operator looks up that party's telephone number in a computer database and provides the telephone number to the person. Typically, the operator, upon locating the telephone number, activates a pre-recorded voice announcement to convey the telephone number to the person. Some directory service providers further offer to connect the person to the telephone number for a predetermined fee.

Having the operator connect the call to the requested telephone number is especially useful when the person is in a situation in which it is difficult to write down the telephone number, such as when driving a car. However, when a directory assistance operator connects the call to the requested party, a call log entry for the connected call is not generated. For example, if a subscriber places a call to directory assistance using a telephone and asks to be connected to a department store, only the call to directory assistance would be listed on the telephone's call log. There would not be a record in the call log reflecting the call connected between the subscriber's telephone and the department store. As a result, the telephone's call log would not have a complete list of all the connected calls.

SUMMARY

A method for providing a call log entry for a transferred call is described. Beneficially, the invention provides a subscriber a record of a call connected by a transferring node.

The subscriber using a subscriber terminal calls a first telephone number associated with a first party. A call between the subscriber and the first party is connected and a call log entry is placed in the subscriber terminal's call log. The call log entry includes the first telephone number and a time stamp indicating a time that the call was connected.

The first party transfers the subscriber to a second party associated with a second telephone number. A call between the subscriber and the second party is connected. The first party sends the subscriber terminal a data message indicating that a call was transferred to the second telephone number. The data message may contain the second telephone number and a time stamp indicating a time that the call was connected. The message may be formatted to be placed in the subscriber terminal's call log. The subscriber terminal parses the call log information from the data message and places the information into appropriate fields in the call log. Thus, the call log contains a first call log entry for the call connected between the subscriber and the first party and a second call log entry for the call connected between the subscriber and the second party.

These as well as other aspects and advantages will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Figure 1:
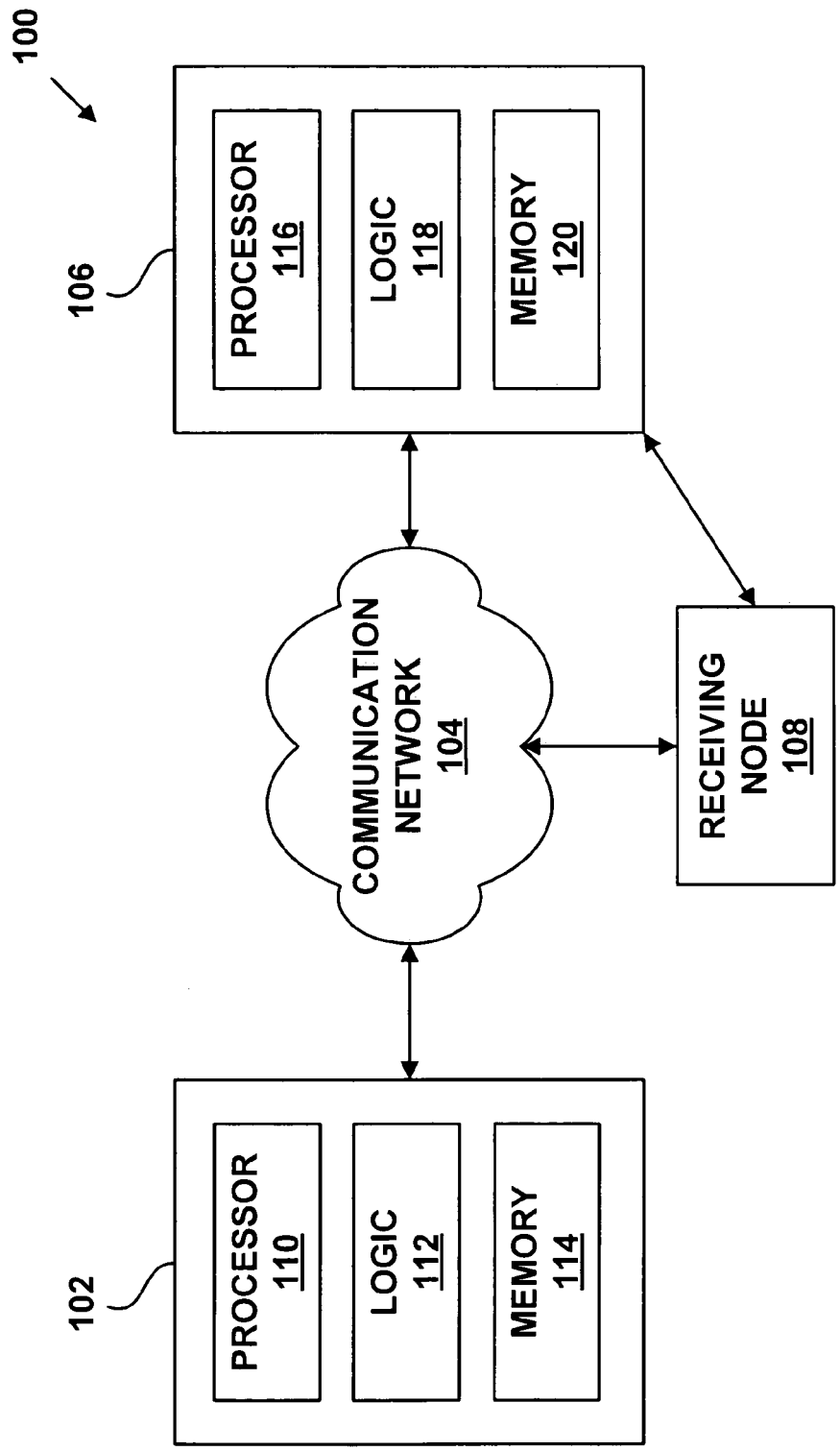
FIG. 1 is a block diagram of a system for providing a call log entry for a transferred call according to the exemplary embodiment.

FIG. 1 is a block diagram of a system 100 for providing a call log entry for a transferred call. The system 100 includes a subscriber terminal 102, a communications network 104, a transferring node 106, and a receiving node 108. The subscriber terminal 102, the transferring node 106, and the receiving node 108 may be connected to the communications network 104. The transferring node 106 and the receiving node 108 may also be connected directly.

Figure 2:
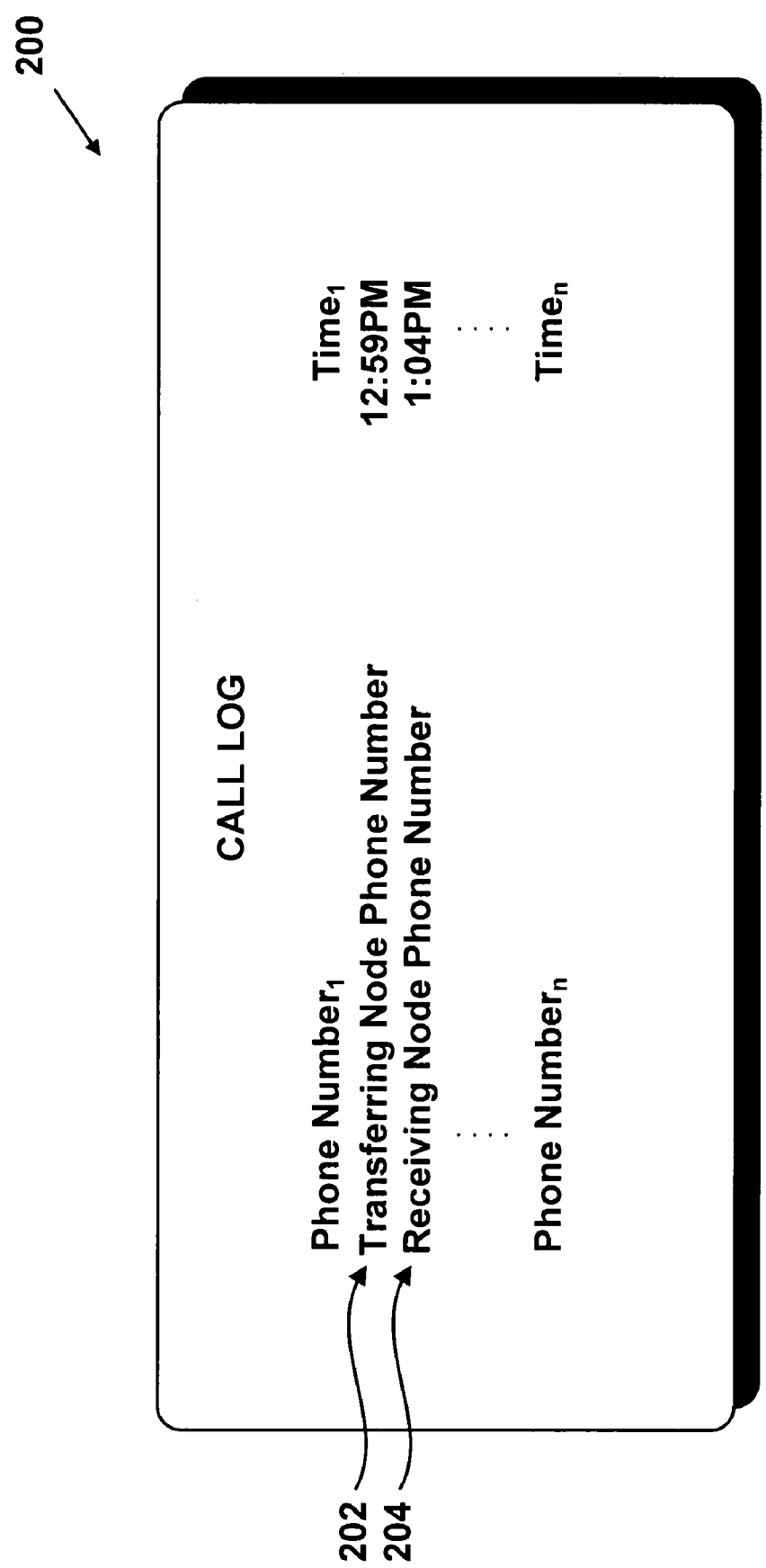
FIG. 2 is a pictorial representation of a call log according to the exemplary embodiment.

The subscriber terminal 102 may be any device that can send and receive calls, and maintain a log of the incoming and outgoing calls. For example, the subscriber terminal 102 may be a landline telephone, a wireless telephone, a personal digital assistant, a personal computer, or other device having call log functionality. The subscriber terminal 102 may include a processor 110, logic 112, and memory 114. The processor 110 may execute the logic 112 stored in the memory 114. A call log 200 may also be stored in the memory 114. The call log 200 is depicted in FIG. 2.

The transferring node 106 may be any device that can send, receive and transfer calls, and send data messages. For example, the subscriber terminal 102 may be a wireless telephone, a directory assistance node, or other device having call transfer and data messaging capabilities. The transferring node 106 may include a processor 116, logic 118, and memory 120. The processor 116 may execute the logic 118 stored in the memory 120.

The receiving node 108 may be any device operable to send and receive calls. For example, the receiving node 108 may be a landline telephone, a wireless telephone, a personal computer, or other device having telephony functionality.

A user of the subscriber terminal 102 may call a first telephone number associated with the transferring node 106. Alternatively, the transferring node 106 may call the subscriber terminal 102 using the first telephone number. A call between the subscriber terminal 102 and the transferring node 106 may be connected via the communications network 104. A call log entry 202 may be placed in the subscriber terminal's 102 call log 200. The call log entry 202 may include the telephone number associated with the transferring node 106 and a time stamp indicating the time the call between the subscriber terminal 102 and the transferring node 106 was connected. The call log entry 202 may include additional information, such as the name associated with the transferring node 106, the date of the call, and the length of the call.

The transferring node 106 may transfer the user of the subscriber terminal 102 to the receiving node 108 via communications network 104. Alternatively, the transferring node 106 and the receiving node 108 may be located in a common network, such as an internal corporate telephony network. In this scenario, the transferring node 106 may transfer the user of the subscriber terminal 102 to the receiving node 108 more directly.

The transferring node 106 may send the subscriber terminal 102 a data message indicating that the call was transferred to the receiving node 108. The data message may contain call log information, such as the telephone number of the transferring node, the telephone number of the receiving node 108, and a time stamp indicating the time that the call between the subscriber terminal 102 and the receiving node 108 was connected. The call log information may include additional information, such as the name associated with the receiving node 108, the date of the call, and the length of the call.

The data message may be formatted to be placed in the subscriber terminal's 102 call log 200. The data message may be converted to a call log entry 204, which may be placed in the subscriber terminal's 102 call log 200. The call log entry 204 includes the telephone number associated with the receiving node 108 and a time stamp indicating the time the call between the subscriber terminal 102 and the receiving node 108 was connected. The call log entry 204 may include additional information, such as the name associated with the receiving node 108, the date of the call, and the length of the call.

As a result of the transferred call, the call log 200 contains a first call log entry 202 for the call connected between the subscriber terminal 102 and the transferring node 106 and a second call log entry 204 for the call connected between the subscriber terminal 102 and the receiving node 108. The call log 200 may include call log entries for calls connected before the call connected between the subscriber terminal 102 and the transferring node 106. Further, the call log 200 may include call log entries for calls connected after the call connected between the subscriber terminal 102 and the receiving node 108.

Figure 3:
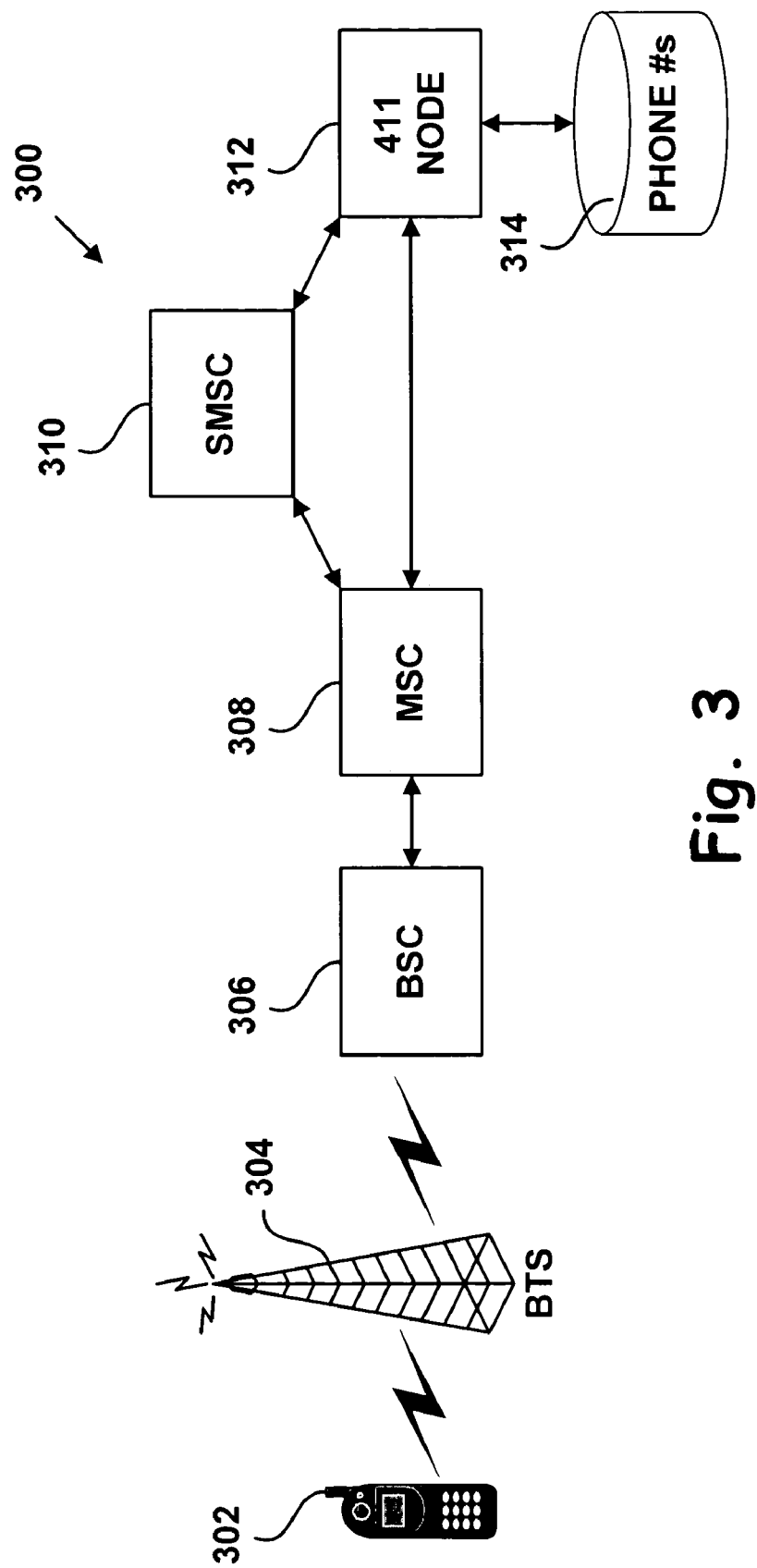
FIG. 3 is a block diagram of a system for providing a call log entry for a call connected by directory assistance according to the exemplary embodiment.

An example is provided with reference to FIG. 3 to further explain the system 100 for providing a call log entry for a transferred call. This example describes particular devices and messaging techniques. However, this example is not intended to limit the scope of the invention to the particular devices and messaging techniques described. For example, FIG. 3 depicts the subscriber terminal 102 as a mobile station, the communications network 104 as a wireless network, and the transferring node 106 as a directory assistance node. However, it is understood that other subscriber terminals, communication networks, and transferring nodes may be used in the system 100.

FIG. 3 depicts a block diagram of a system 300 for providing a call log entry for a call connected by directory assistance. The system 300 includes a mobile station 302, a base transceiver station ("BTS") 304, a base station controller ("BSC") 306, a Mobile Switching Center ("MSC") 308, a Short Messaging Service Center ("SMSC") 130, a directory assistance node 312 ("411 Node"), and a database of telephone numbers 314. The system 300 may include additional entities not shown in FIG. 3. For example, the system 300 may include a bulk message gateway ("BMG"), which may be used to identify the SMSC 310 associated with the mobile station 302.

The mobile station 302 may be any device that can be used for wireless communications, such as a cellular telephone, a personal digital assistant, a personal computer, or other telecommunication device. For example, the mobile station 302 may be a third generation ("3G") or later mobile station capable of simultaneously engaging in voice and data sessions. A 3G mobile station preferably operates in compliance with the 3GPP/3GPP2 industry specifications. (The 3GPP/3GPP2 industry specifications may be found at www.3gpp.org and www.3gpp2.org, respectively.) The mobile station 302 may include a processor programmed with (i) a media codec (such as G.723.1 for encoding and decoding digital voice signals), (ii) a Session Initiation Protocol ("SIP") user agent application to set up packet-data communication sessions, and/or (iii) a real-time transport protocol ("RTP") application to facilitate sending and receiving real-time media packet streams, such as Voice over Internet Protocol ("VoIP") messages.

The mobile station 302 is further programmed with logic, such as a short message entity ("SME"), to be able to receive short message service ("SMS") messages, as defined by industry standard IS-637A (promulgated by the Telecommunications Industry Association ("TIA")/Electronics Industry Association ("EIA")). According to this standard, an entity can send an SMS message to a given mobile station by sending the SMS message to a BMG, which forwards the message in turn to an SMSC. By querying a Home Location Register ("HLR"), the SMSC then determines which MSC is currently serving the destination mobile station, and then forwards the SMS message to that MSC. The MSC then sends the SMS message via a BSC and a BTS to the mobile station. The mobile station then alerts a user of the new message and may display the message to the user.

The mobile station 302 communicates over an air interface with the BTS 304. The BTS 304 performs radio resource management tasks for its given coverage area. The BTS 304 communicates with the BSC 306 over the air interface. The BSC 306 manages the power levels and frequencies transmitted by the BTSs under its control, including the BTS 304, and may also control handoffs between BTSs. The combination of the BTS 304 and the BSC 306 may function to transmit voice and data traffic between mobile stations.

The BSC 306 communicates with the MSC 308 via a communication link. The communication link may include a Primary Rate Interface ("PRI") employing a plurality of communication and control channels, which may be carried over T1 and/or E1 carrier lines. The MSC 308 is responsible for switching calls. Typically, the MSC 308 also performs the signaling needed to originate and terminate calls to mobile stations, such as the mobile station 302.

The SMSC 310 is a functional entity that stores and forwards SMS messages. The store and forward function provides a method of sending short messages to their destination recipient or storing those messages if the recipient is unavailable to receive them. This store and forward function can generally be distinguished from the real-time delivery requirements of voice calls, although SMS messages may be delivered in real time.

The SMSC 310 can send messages to or from an SME. The SME is an entity that can receive or send short messages. The SME is often an application entity that resides on a mobile station, such as the mobile station 302. Alternatively, the SME can reside on another entity in a wireless or fixed network. Typically, the SME can be arranged to compose, store, dispose of, act upon, display and/or otherwise manage short messages. The SME may also perform signaling functions to support other delivery features; such as mobile station location and status queries, and mapping of destination addresses.

The directory assistance node 312 may operate as a service node ("SN") within the system 300. When a call is placed to directory assistance, the telephone number identifies the call as a directory assistance call. For example, calls to "411" or "555-1212" may indicate that the call is a directory assistance call. When the MSC 308 determines that the call is a directory assistance call based on the dialed telephone number, the MSC 308 switches the call to the directory assistance node 312.

A party calling a directory assistance telephone number may be prompted by a directory assistance operator or a voice recognition system to provide information needed to obtain a telephone number. For example, the information may include the name of the party associated with the requested telephone number and the city in which the party is located. Other information, such as street address and state, may also be requested by the directory assistance operator or the voice recognition system. Based on the information provided by the calling party, the directory assistance node 312 may access the database of telephone numbers 314 to retrieve the requested telephone number. The requested telephone number may then be provided to the calling party by the directory assistance operator or with a pre-recorded voice announcement.

The directory assistance node 312 may provide the calling party with the option of having the directory assistance node connect the call to the requested telephone number. The calling party may receive the option verbally from the directory assistance operator or by receiving a pre-recorded message providing instructions regarding how to have the call connected. The pre-recorded message may instruct the calling party to press one or more keys on a keypad located on the mobile station 302 or repeat a word or phase to indicate the calling party's desire to have the directory assistance node 312 connect the call to the requested telephone number. If the calling party chooses this option, the directory assistance node 312 may then connect the call to the requested telephone number via the MSC 308 or another switch.

In addition to connecting the call to the requested telephone number, the directory assistance node 312 may send an SMS message containing call log information to the mobile station 302 via the SMSC 310. The SMSC 310 may determine that the MSC 308 is currently serving the mobile station 302 (e.g., through automatic number identification) and forward the SMS message to the MSC 308. The MSC 308 may then send the SMS message via the BSC 306 and the BTS 304 to the mobile station 302. The SMS message may be delivered to the mobile station 302 during the call to the requested telephone number. Alternatively, the SMS message may be delivered to the mobile station 302 after the call to the requested telephone number has terminated.

The SMS message may include the requested telephone number and the time that the call was connected. Other information may also be included in the SMS message, such as the name of the called party, the address of the called party, alternative numbers assigned to the called party, and any other information located in the database of telephone numbers 314.

The SMS message may be formatted so that the mobile station 302 recognizes the SMS message as a call log message. For example, a special text code, such as "//411" may be added to a header of the SMS message. When the mobile station 302 receives a data message with the special text code in the header, logic within the mobile station 302 may recognize that call log information may be in a body of the message. The body of the message may be formatted to be compatible with the format of the mobile station's call log. The mobile station 302 may then parse the information from the body of the message and place the information into appropriate fields in the call log.

As a result of the call to directory assistance and the subsequent connection to the requested telephone number, the mobile station 302 may have two entries in its call log. The first entry may be the call to directory assistance and the second entry may be the call to the requested telephone number. The call log entries may include the telephone number and the time of connection for each connection. Thus, the call log documents that a call was connected to the requested telephone number at a specific time.

The directory assistance node 312 may automatically send the SMS message containing the call log entry information to the mobile station 302. Alternatively, the directory assistance node 314 may request permission from the user of the mobile station 302 prior to sending an SMS message containing the call log entry information. For example, the directory assistance operator may verbally obtain permission from the user. Alternatively, the user may be prompted via a voice recognition system to press one or more keys on the keypad located on the mobile station 302 or to repeat a word or phase indicating the user's desire to have the directory assistance node 314 send the SMS message to the mobile station 302. If the user gives permission, then the directory assistance node 312 may send the SMS message to the mobile station 302 via the SMSC 310.

While the data message described above is an SMS message, other types of data messages may be sent from the directory assistance node 312 to the mobile station 302 to provide call log information documenting a transferred call.

For example, the data message may be a multimedia messaging service ("MMS") message. MMS is a means by which multimedia messages can be sent over the air interface to and from wireless devices. Multimedia consists of one or more media elements, such as text, voice, image, and video. In this embodiment, the system 300 may include a multimedia messaging service center ("MMSC") which stores MMS messages and transmits an MMS notifier to a terminating device. In response to the MMS notifier, the terminating device may give the MMSC permission to deliver the stored MMS message.

As another example, the data message may be a message sent over a paging channel ("PCH") to the mobile station 302. The PCH may be an overhead channel used to convey pages to mobile stations. As yet another example, the data message may be a Direct Transfer Application Part ("DTAP") message. For example, the MSC 308 may send a Flash with Information message to the BSC 306, which is then forwarded to the mobile station 302. Other data message formats may also be used to provide call log information to the mobile station 302.

Figure 4:
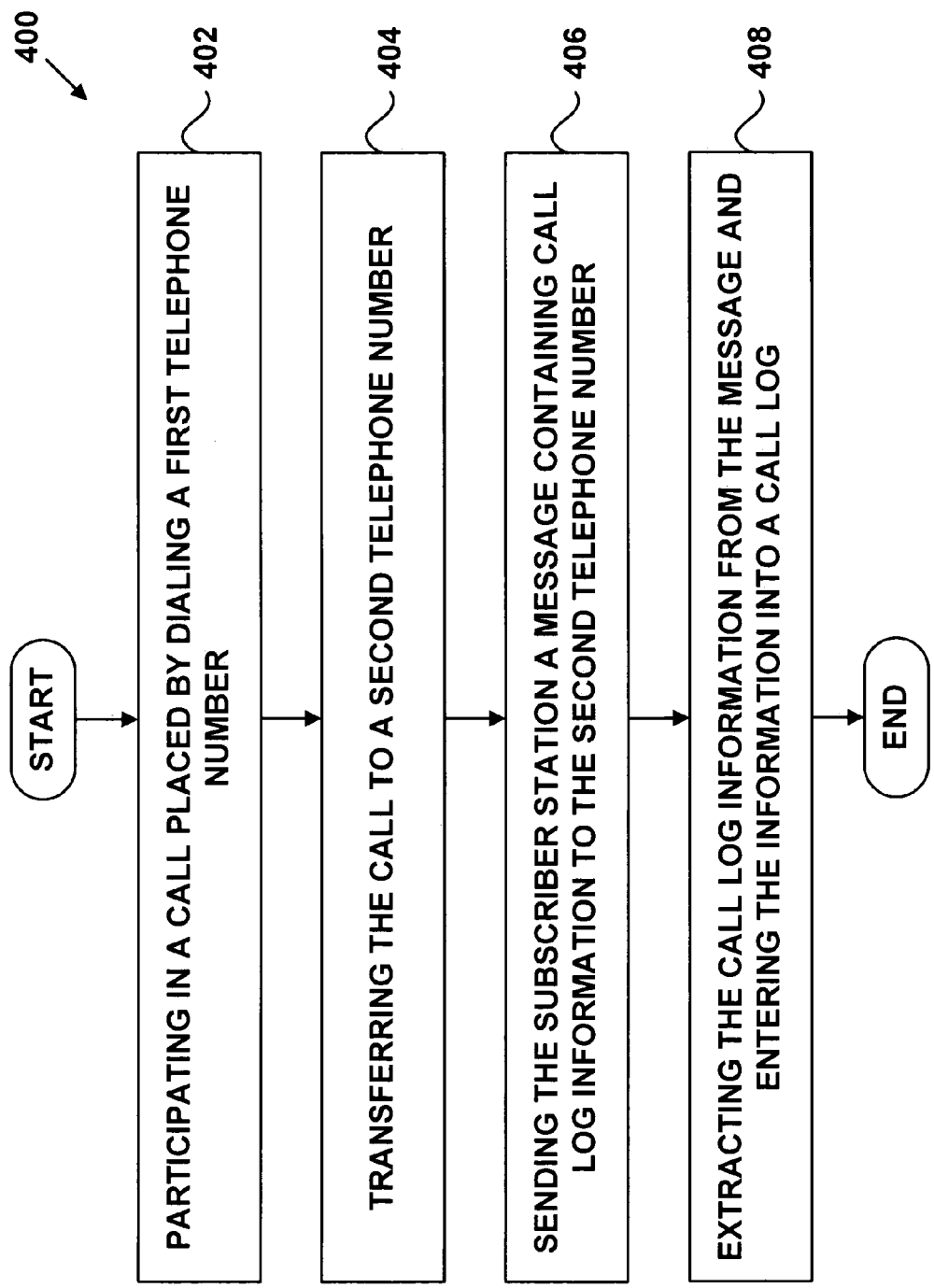
FIG. 4 is a flow chart of a method for providing a call log entry for a transferred call according to the exemplary embodiment.

FIG. 4 depicts a flow chart of a method 400 for providing a call log entry for a transferred call. The method 400 may begin after a subscriber using a subscriber terminal calls a first telephone number associated with a first party. The first party may be a user associated with the transferring node 106 depicted in FIG. 1. Alternatively, the method 400 may begin after the first party calls the subscriber terminal using the first telephone number.

At block 402, the call between the subscriber terminal and the first party may be connected. A call log entry may be entered into a call log located on the subscriber terminal indicating that the call was connected between the subscriber and the first party. The first party may determine that the subscriber needs to be connected to a second party. This determination may be made after the subscriber communicates the purpose of the call to the first party. For example, if the first party is a directory assistance operator, the subscriber may ask the operator to connect the call to a requested telephone number.

At block 404, the first party transfers the call to a second telephone number associated with a second party. The call may be transferred to the second telephone number using conventional switching mechanisms and signaling protocols. At block 406, the transferring node associated with the first party may send the subscriber terminal a data message containing call log information. The data message may indicate that a call was connected between the subscriber and the second party.

At block 408, the subscriber terminal extracts the call log information from the data message and enters the information into the call log. As a result of the transferred call, the call log includes a first call log entry documenting a connection between the subscriber and the first party and a second call log entry documenting the connection between the subscriber and the second party.

For example, the method 400 may begin after a subscriber places a call to a main or first telephone number associated with a facility using a subscriber terminal. The facility operator, receptionist, or other person may identify a second telephone number in which the user needs to be connected. The second telephone number may be associated with a department or an individual. The facility operator may transfer the subscriber to the second telephone number of the department or individual. A transferring node may send the subscriber terminal a data message indicating that a call was connected to the second telephone number.

As a result of the call to the facility and the subsequent connection to the second telephone number, the subscriber terminal may have two entries in its call log. The first entry may be the initial call to the facility and the second entry may be the transferred call to the department or individual. The call log entries may include the telephone number and the time of connection for each connection. Thus, the call log documents that a call was connected between the subscriber terminal and the department or individual at a specific time.

While two call log entries have been described, it is understood that additional entries may be added to the call log if the call is transferred multiple times. For example, the subscriber may call a customer service center. After explaining the problem to a customer service representative, the customer service representative may transfer the subscriber to a second telephone number which is assigned to the department responsible for handling that type of problem. After explaining the problem to a department representative, the department representative may transfer the subscriber to a third telephone number which is assigned to a specialist within the department that handles that type of problem.

As a result of the call to the facility and the subsequent connection to the second and third telephone numbers, the subscriber terminal may have three entries in its call log. The first entry may be the initial call to the facility, the second entry may be the transferred call to the department, and the third entry may be the transferred call to the specialist. The call log entries may include the telephone number and the time of connection for each connection. Thus, the call log documents that a call was connected between the mobile station and both the department and specialist at a specific time. This information may be useful if the problem is not resolved and the user has to call the customer service center at a later time.

An exemplary embodiment of the present invention has been described above. Those skilled in the art will understand that changes and modifications may be made to this embodiment without departing from the true scope and spirit of the present invention, which is defined by the claims.

We claim:

1. A method for providing an entry in a call log for a transferred call, the method comprising:
    participating in a call that is placed by dialing a first telephone number, wherein a subscriber using a subscriber terminal is a party to the call;
    transferring the call to a second telephone number;
    sending the subscriber terminal a call log data message containing data for entry in the call log, the message indicating that a call was connected to the second telephone number; whereby the data may be entered into the call log.

2. The method of claim 1, wherein the subscriber terminal is a mobile station.

3. The method of claim 1, wherein the data message is a message selected from the group consisting of an SMS message, an MMS message, a page, and a DTAP message.

4. The method of claim 1, wherein the data message includes the second telephone number.

5. The method of claim 1, wherein the data message includes a time stamp indicating a time that the call was connected to the second telephone number.

6. The method of claim 1, further comprising obtaining permission from the subscriber to send the data message indicating that the call was connected to the second telephone number.

7. The method of claim 1, wherein a directory assistance node receives the call from the subscriber, transfers the call to the second telephone number, and sends the subscriber terminal the data message.

8. The method of claim 7, wherein the second telephone number is a telephone number requested by the subscriber.

9. The method of claim 1, wherein a facility receives the call from the subscriber, transfers the call to the second telephone number, and sends the subscriber terminal the data message.

10. The method of claim 9, wherein the facility is a customer service center.

11. A method for providing a call log entry for a transferred call, the method comprising:

participating in a call that is placed by dialing a first telephone number, wherein a subscriber using a subscriber terminal is a party to the call;

transferring the call to a second telephone number;

sending the subscriber terminal a data message indicating that a call was connected to the second telephone number, wherein the data message is formatted to be placed in a subscriber station's call log.

12. The method of claim 11, wherein the data message includes a header and a body, wherein the header contains a code indicating that the body contains call log information.

13. The method of claim 12, wherein the subscriber terminal parses the call log information from the body and places the call log information in the call log.

14. A method for entering call log information regarding a transferred call into a call log located on a subscriber terminal, comprising in combination:

receiving a data message from a node that has transferred a call;

identifying the data message as a call log message;

parsing call log information from a body of the data message; and placing the parsed call log information into fields in the call log.

15. The method of claim 14, wherein a mobile station receives the data message, identifies the data message as a call log message, parses the call log information from the body of the data message, and places the parsed call log information into the fields in the call log.

16. The method of claim 14, wherein the node is a directory assistance node.

17. The method of claim 14, wherein the node is a transferring node at a facility.

18. The method of claim 17, wherein the facility is a customer service center.

19. The method of claim 14, wherein identifying a data message as a call log message includes recognizing a code in a header of the data message.

20. The method of claim 19, wherein the code indicates the body of the data message contains the call log information.

21. The method of claim 14, wherein the data message is a message selected from the group consisting of an SMS message, an MMS message, a page, and a DTAP message.

22. The method of claim 14, wherein the data message includes a telephone number.

23. The method of claim 14, wherein the data message includes a time stamp indicating a time that a call was connected.

* * * * *